Figure 1:
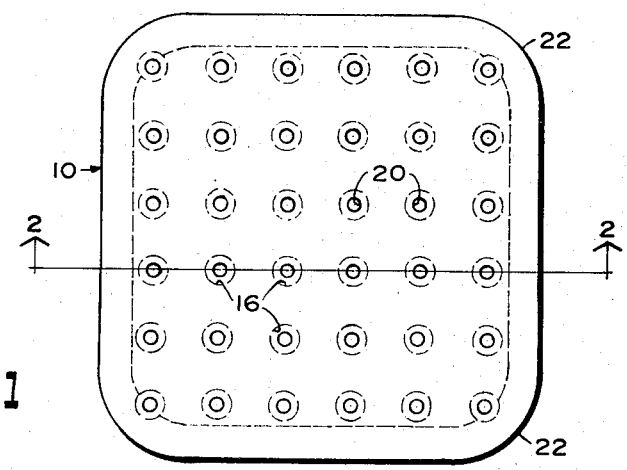

Dec. 12, 1967   JEAN-PAUL L. DREYFUS   3,357,342
FROZEN FOOD COOKER

Filed Jan. 18, 1965   2 Sheets-Sheet 1

INVENTOR.
Jean-Paul L. Dreyfus
BY
ATTORNEY

Dec. 12, 1967    JEAN-PAUL L. DREYFUS    3,357,342
FROZEN FOOD COOKER
Filed Jan. 18, 1965    2 Sheets-Sheet 2

INVENTOR.
Jean-Paul L. Dreyfus

BY *Valler S. Zebrowski*

ATTORNEY

3,357,342
FROZEN FOOD COOKER
Jean-Paul L. Dreyfus, Rego Park, N.Y., assignor to Corning Glass Works, Corning, N.Y., a corporation of New York
Filed Jan. 18, 1965, Ser. No. 426,219
3 Claims. (Cl. 99—418)

My invention relates to cooking utensils and more particularly to an improved rack for supporting and steam cooking foods, especially frozen foods, within a cooking vessel.

Steam cooking is a superior method of cooking some types of food such as vegetables. Its advantages include retention of flavor and nutritional value within the vegetables, use of less water for cooking, reduced chances for scorching and burning, and other benefits and advantages such as improved efficiency known to those familiar with the culinary art.

To effectively cook foods by the steam method, some device such as a rack, trivet, spacer or the like is required to support the food a short distance above the bottom of the cooking vessel. Usually the spacer is perforated to allow circulation of liquid or steam around and through the food. Most of the conventional racks are thin and made from metals such as aluminum, stainless steel, and the like. They are characteristically perforated with holes spaced and sized in such a manner that the food will not pass through the holes, but water will freely pass through them for proper drainage.

Conventionally cooked frozen foods often have overcooked exterior portions and undercooked interiors. Blocks of frozen food, although conveniently stored and handled, are seldom cooked with ease. Broccoli, cauliflower, and spinach, as examples of bulky frozen food items, do not readily separate into small easily cooked discrete bodies. On the other hand, peas, beans, diced carrots and the like may be easily separated.

It is often difficult, if not impossible, to mechanically separate the monolithic blocks of frozen food early in the cooking process. When cooking is well along, it is too late to take advantage of the benefits offered by smaller chunks of food. Thus cooking would be easier and the cooked product more palatable if early breakup of frozen blocks could be induced.

Ordinary steam cooker racks provide little or no assistance with this problem because they are primarily designed to only support the food in a steaming atmosphere resulting in inefficient, time consuming and decentralized permeation of the frozen food block by steam. Rapid, thorough and efficient cooking of frozen foods by the steam method is much to be desired.

My invention offers a solution to these problems and is likewise directed to securing the benefits and advantages of steam cooking for the user.

Accordingly, an object of my invention is to speed up the process of cooking frozen foods.

Another object of my invention is to provide uniformly and thoroughly cooked frozen foods.

Still another object of my invention is to encourage steam cooking of frozen foods by making it easy, efficient and economical.

A further object of my invention is to assist the early break-up of frozen food blocks into smaller chunks while cooking.

These, together with other objects and advantages of my invention will become apparent from the following description.

Broadly, one embodiment of my invention comprises an improved cooking utensil having a perforated plate-like body with substantially parallel top and bottom surfaces, adapted to fit within a cooking vessel. The body supports a block of frozen food and produces steam jets to accelerate the cooking process.

Figure 2:
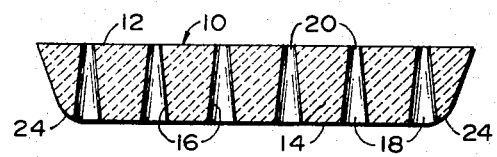
Figure 3:
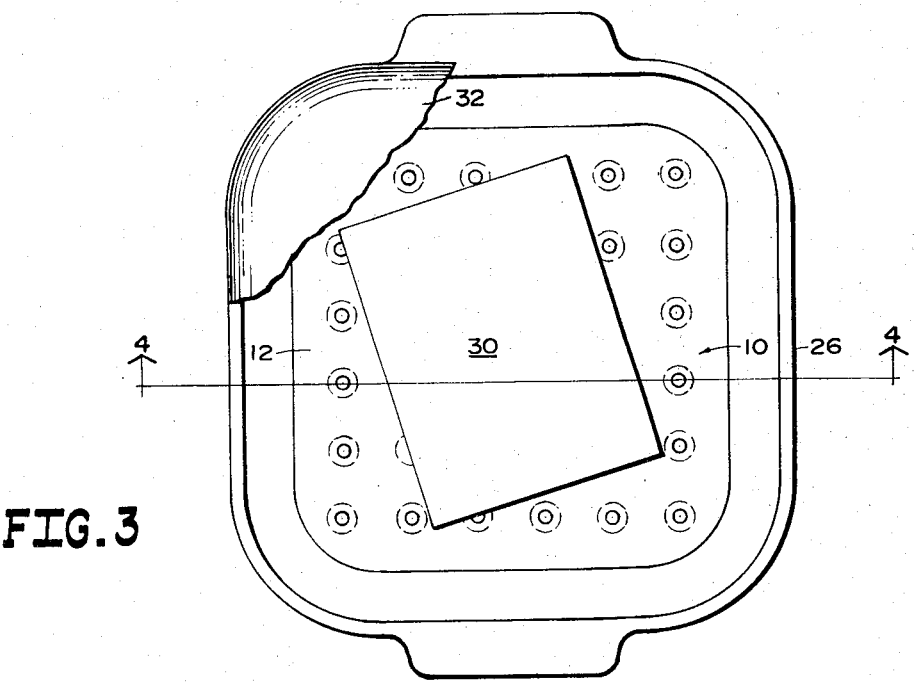
Figure 4:
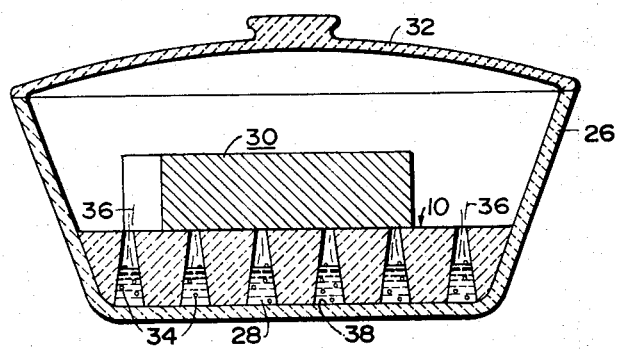
Figure 5:
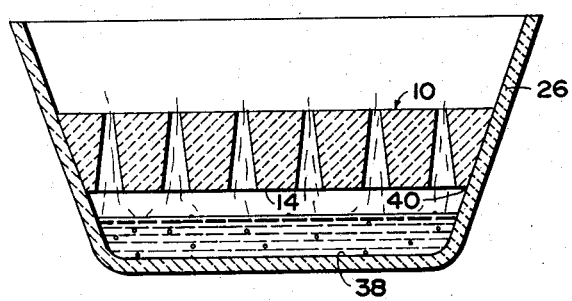

FIGURE 1 is a plan view of my invention.
FIGURE 2 is a cross sectional view of my invention taken along line 2—2 of FIGURE 1.
FIGURE 3 is a plan view of my invention placed within a saucepan which contains a block of frozen vegetable.
FIGURE 4 is a cross sectional view of my invention taken along line 4—4 of FIGURE 3.
FIGURE 5 is a cross sectional view of another embodiment of my invention.

Referring to the drawings, FIGURES 1 and 2 illustrate one embodiment of my invention wherein a generally rectangular plate-like body 10 of glass-ceramic has two substantially flat, parallel surfaces 12 and 14, and a plurality of tapered holes 16 having large orifices 18 in lower surface 14 of body 10 and smaller orifices 20 in upper surface 12 of body 10.

Tapered holes 16 may be arranged in a regular pattern as illustrated or may be positioned at random in body 10.

The shape of body 10 is adapted by smoothly rounded corners 22 and edges 24 to fit within a saucepan 26 as shown in FIGURES 3 and 4. It is to be noted that body 10 need not be rectangular, but in fact may have other shapes such as round, oval, square and like in order to fit within saucepans and cooking vessels of shapes other than those illustrated.

FIGURE 3 illustrates the embodiment of my invention wherein body 10 in saucepan 26 is immersed in water. Frozen vegetable 30 lies on top surface 12 of body 10.

FIGURE 4 illustrates body 10 within saucepan 26 containing water 28 and frozen vegetable 30. Cover 32 is placed on the saucepan when heat is applied, and boiling begins. Steam bubbles 34 are formed producing steam jets 36 which permeate vegetable 30. Note that body 10 seats flush against inside surface 38 of saucepan 26.

The operation of my invention is simple. Body 10 is placed in a saucepan 26 or other suitable cooking vessel. Sufficient water 28 is added to cover surface 12 of the body. Frozen vegetable block 30 is then placed on body 10 within the saucepan, and cover 32 is placed on top of the saucepan. The water is then heated, and when boiling begins the water percolates through holes 16. As cooking progresses and heating continues, water 28 turns to steam, and steam jets 36 are formed. The steam jets penetrate tiny crevices found in the block of frozen vegetable, melting ice crystals therein, and assisting fragmentation of the block in a pattern generally conforming to the hole pattern in the body.

The tapered configuration of holes 16 creates higher velocity steam than would ordinarily occur with cylindrical holes in a body of the same thickness, and much higher velocity than that of steam flowing through holes in a thin body such as sheet metal. The beneficial effect of the high velocity steam jets lies in their increased ability to do work, to cook food in this instance.

FIGURE 5 illustrates a different embodiment of my invention wherein body 10 is placed within saucepan 26, touching only side walls 40 but not inside bottom surface 38, thus leaving considerable space between the flat bottom surface 14 of body 10 and the bottom of the saucepan.

If desired, the perforated rack or cooker may be supported above the bottom of the vessel in which it is placed, thus allowing more water to be placed in the cooking vessel without immersing the food to be cooked.

Other arrangements for accomplishing the purpose, such as molded-in-feet or a downturned flange can be envisioned and are considered to be within the scope of my invention.

My invention may be made from glass-ceramic materials of the type referred to in U.S. Patent No. 2,920,971. Other materials such as glass, ceramic, plastic and metal, including stainless steel, aluminum and the like may be used.

Although I have described my invention with respect to certain specific embodiments thereof, I do not wish to be thereby limited, as various modifications of my invention are intended to be encompassed within its true spirit and scope as indicated by the following claims.

I claim:

1. An improved cooking utensil comprising a removable plate-like body perforated with tapered holes, said body having substantially parallel top and bottom surfaces and adapted to fit within a saucepan in substantially continuous contact with the inside bottom surface thereof, said holes extending between said top and bottom surfaces.

2. An improved plate-like frozen food cooking utensil of glass-ceramic material having two substantially parallel surfaces, said utensil being perforated with tapered holes, and adapted to removably fit within a cooking vessel so that one surface is in substantially continuous contact with the inside bottom surface of said cooking vessel.

3. A cooking utensil adapted to removably fit within a glass-ceramic saucepan comprising a glass-ceramic plate-like body having tapered perforations extending between two substantially parallel surfaces thereof, the larger ends of said perforations terminating in the surfaces adapted to fit in substantially continuous contact with the inside bottom surface of said saucepan.

References Cited

UNITED STATES PATENTS

| | | | |
|---|---|---|---|
| 1,021,133 | 3/1912 | Chaloud | 99—418 |
| 1,356,432 | 10/1920 | Eidt | 99—418 |
| 2,419,299 | 4/1947 | Tanner | 99—418 X |

FOREIGN PATENTS

| | | |
|---|---|---|
| 516,097 | 12/1952 | Belgium. |
| 356,726 | 8/1905 | France. |
| 423,307 | 1/1935 | Great Britain. |

BILLY J. WILHITE, *Primary Examiner.*